United States Patent [19]

Cotter

[11] 4,352,503

[45] Oct. 5, 1982

[54] AUTOMATIC TRANSMISSION SHIFTER FOR BICYCLES

[76] Inventor: James F. Cotter, 105 Crown Ct., Lancaster, Ohio 43130

[21] Appl. No.: 160,653

[22] Filed: Jun. 18, 1980

[51] Int. Cl.$^3$ .............................................. B62M 25/08
[52] U.S. Cl. ..................................... 280/238; 74/346; 74/750 B; 280/201
[58] Field of Search ................. 280/236, 238; 74/535, 74/536, 537, 539, 540, 551, 521, 523, 3.2 R, 752 B; 192/103 R; 474/69, 70, 72, 74; 417/571, 223

[56] References Cited

U.S. PATENT DOCUMENTS

| | | | |
|---|---|---|---|
| 2,369,397 | 2/1945 | Kostenick | 73/523 X |
| 3,622,251 | 11/1971 | Allen | 415/571 X |
| 3,830,521 | 8/1974 | Gardel | 280/236 |
| 3,926,020 | 12/1975 | Dantowitz et al. | 280/238 |
| 3,969,948 | 7/1976 | Pipenhagen | 280/236 X |

FOREIGN PATENT DOCUMENTS 660205  2/1929  France .................................. 474/70

Primary Examiner—Richard A. Bertsch
Assistant Examiner—Mitchell J. Hill
Attorney, Agent, or Firm—Frank H. Foster

[57] ABSTRACT

An automatic transmission for a human powered vehicle is disclosed having an improved speed sensing mechanism. A rotatable shaft is journalled in a support frame mounted on the vehicle and has a plurality of outwardly extending arms fixed to the shaft. Weights are slideably attached to each of the arms to slide along the arms and engage a thrust member. The thrust member has a surface at an acute angle with the axis of the shaft and is axially slideable along the shaft. A spring urges the thrust member toward the weights and a linkage connects the thrust member to the shift member of the transmission. The weight members are forced outwardly by centrifugal force a distance which is a function of a bicycle speed. The weight members force translation of the thrust member along the axis of the shaft a distance proportional to bicycle speed causing a proportional movement of the shift member. An alternative embodiment of the invention has a fluid pump which is drivingly connected to the vehicle for pumping a fluid into a chamber at a rate which is a function of vehicle speed. The chamber has a vent with an adjustable orifice and also communicates with a fluid pressure responsive means with an actuator linked to the shift member of the transmission. The pressure in the chamber is a function of vehicle speed and causes movement of the actuator and hence shifting of the transmission.

3 Claims, 5 Drawing Figures

AUTOMATIC TRANSMISSION SHIFTER FOR BICYCLES

TECHNICAL FIELD

This invention relates to human powered vehicles such as bicycles and more particularly relates to an automatic shifting means for shifting the variable speed transmission of a bicycle.

BACKGROUND ART

Many bicycles and other people powered vehicles are equipped with variable speed transmissions. The transmissions of these vehicles are shifted in order to permit changes in wheel torque and gear speed ratios so that the operator of the vehicle may pedal in pedal speed and pedal torque operating ranges which are comfortable for a human.

While there are many people who enjoy manually shifting such variable speed transmissions, there are others who do not understand their theory of operation and merely want to enjoy the pleasure of riding the vehicle and the exercise without being bothered with gear shifting decisions. These people may shift improperly thereby damaging the mechanism and causing a rough, uncomfortable ride.

Bicycles are typically provided with one of two types of multi-speed transmissions. Some have internally geared rear hubs which come in 2, 3 and 5 speed versions. These may be shifted at any time while pedalling is stopped. Other bicycles have multiple sprockets and derailleurs in which the bicycle chain is moved from one sprocket to another while pedalling of the bicycle continues.

Some prior patents have shown speed sensing devices for automatically shifting the three speed type of transmissions. Others show automatic shifting transmissions which utilize special transmissions designed by the particular inventor.

There is, however, a need for an improved automatic shifting mechanism which can be added to a conventional bicycle without requiring any modification of the existing, conventional, manual shift mechanisms and which provide increased efficiency and improved shifting characteristics.

Another object of the present invention is to provide an automatic transmission which has less mass than prior devices so that less weight is added to the vehicle.

Still another object of the present invention is to provide a speed sensor for an automatic transmission which is designed to better withstand the torque applied to its parts during rapid acceleration and deceleration.

Prior art patents are found in Class 74, subclass 3 and Class 280, subclass 238 and include U.S. Pat. Nos. 3,830,521, 3,969,948, 3,926,020 and other patents.

SUMMARY OF THE INVENTION

The invention includes an apparatus for sensing the speed of a people powered vehicle which is particularly useful for automatically controlling the shift mechanism of the vehicle.

In one embodiment, a rotatable shaft is drivingly connected to a wheel of the vehicle and is provided with a plurality of outwardly extending arms fixed to the shaft. A weight member is slideable along each of the arms. Each weight member engages the surface of a thrust member which has surfaces acutely inclined to the axis of the rotatable shaft and is axially slideable along the shaft. The thrust member is attached to the shift member of the vehicle. The weight members are forced outwardly by centrifugal force a distance which is a function of speed. They move the thrust member in axial translation for controlling the shift member of the vehicle.

In another embodiment, the speed sensing means has a fluid pump which is drivingly connected to the vehicle and pumps a fluid into a connected chamber. The chamber has a vent and is also connected to a fluid pressure responsive means having an actuator which moves a distance which is proportional to the pressure in the chamber. The actuator is linked to the shift member of the vehicle. Motion of the vehicle causes fluid to be pumped into the chamber at a rate which is a function of vehicle speed and escapes from the chamber at a rate proportional to the size of the orifice of the vent. Variations in chamber pressure control the actuator position which in turn controls the shift mechanism of the vehicle.

DESCRIPTION OF THE PREFERRED EMBODIMENTS FOR CARRYING OUT THE INVENTION

Figure 1:
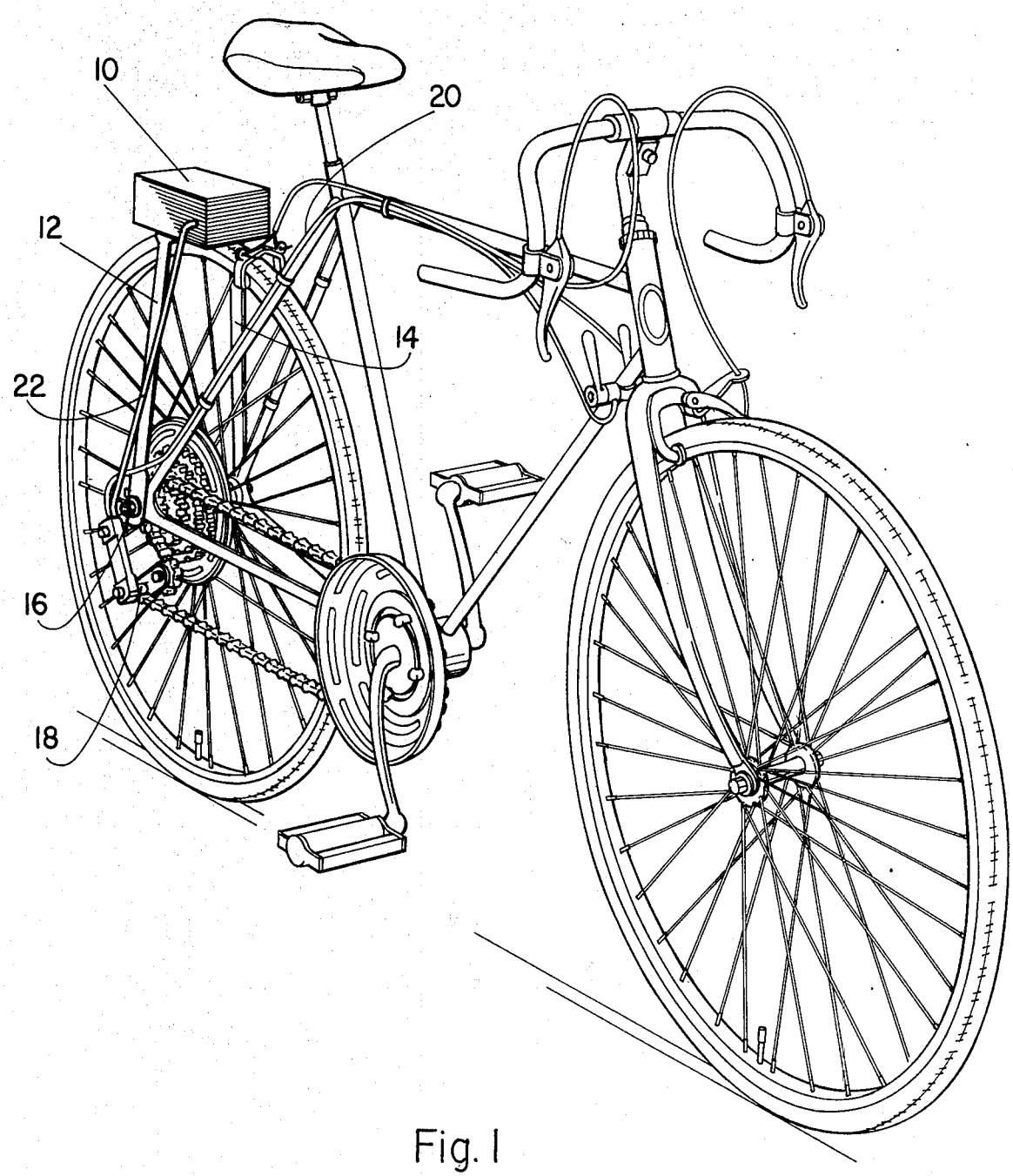
FIG. 1 is a view in perspective of a portion of a ten speed bicycle having mounted thereon an automatic transmission embodying the present invention.

FIG. 1 shows an embodiment of the invention which is encased in a housing 10 and mounted on the rear of a ten speed bicycle by means of support braces 12 and 14 which are bolted to the rear axle 16. The conventional derailleur 18 is connected by a manual shift cable 20 to the shift lever (not shown) which is conventionally mounted on the handle bars of the bicycle.

Also connected to the derailleur is an automatic shift cable 22 which is merely clamped along with the end of the manual cable 20 to the same position on the derailleur. Thus, the only modification of the conventional bicycle is the attachment of the braces 12 and 14 to the axle 16 and the additional connection of the automatic shifting cable 22 to the derailleur at the point of attachment of the manual shift cable 20.

Figure 2:
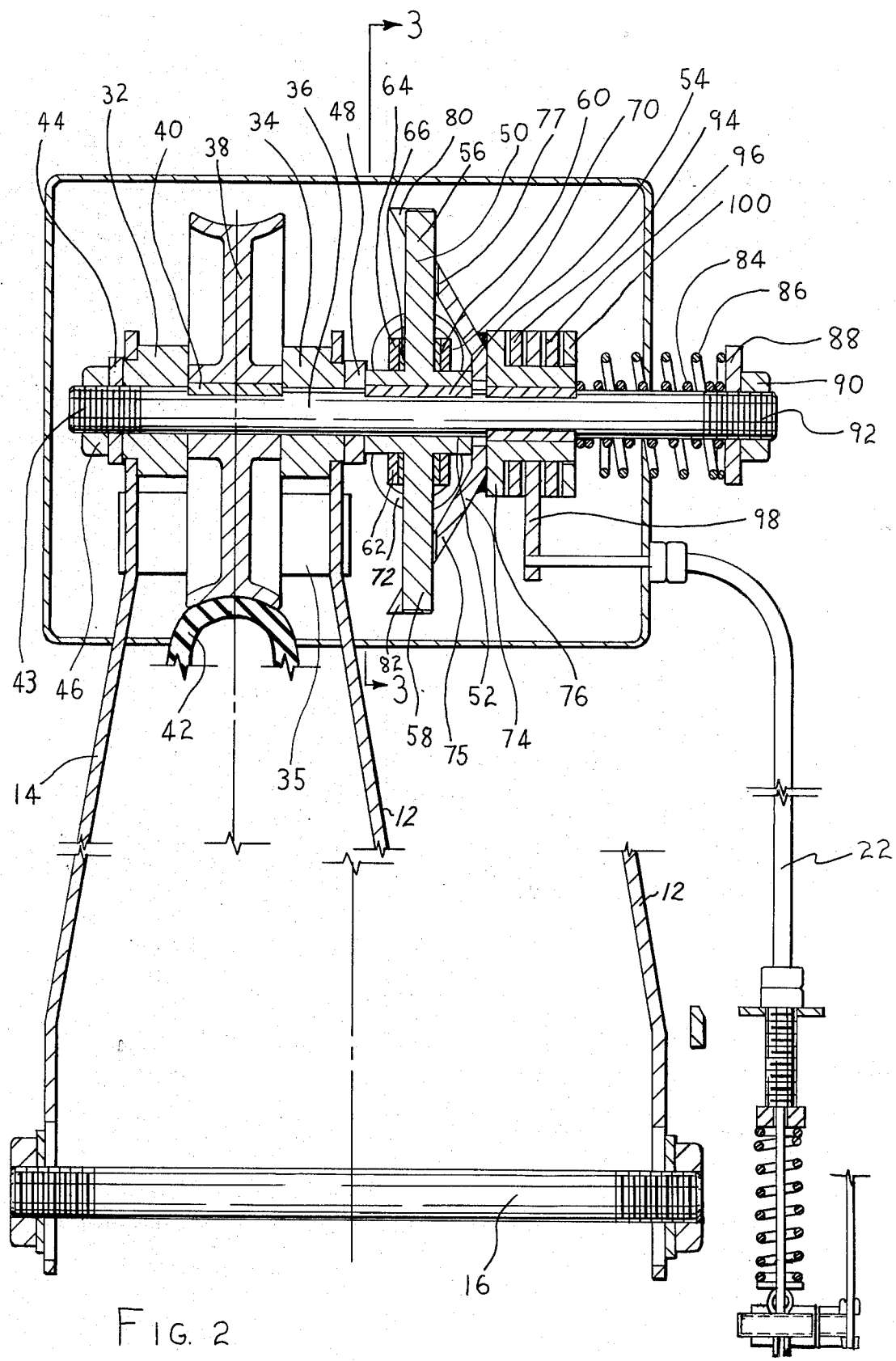
FIG. 2 is a view in vertical section taken along the rotatable shaft and illustrating an embodiment of the invention.
Figure 3:
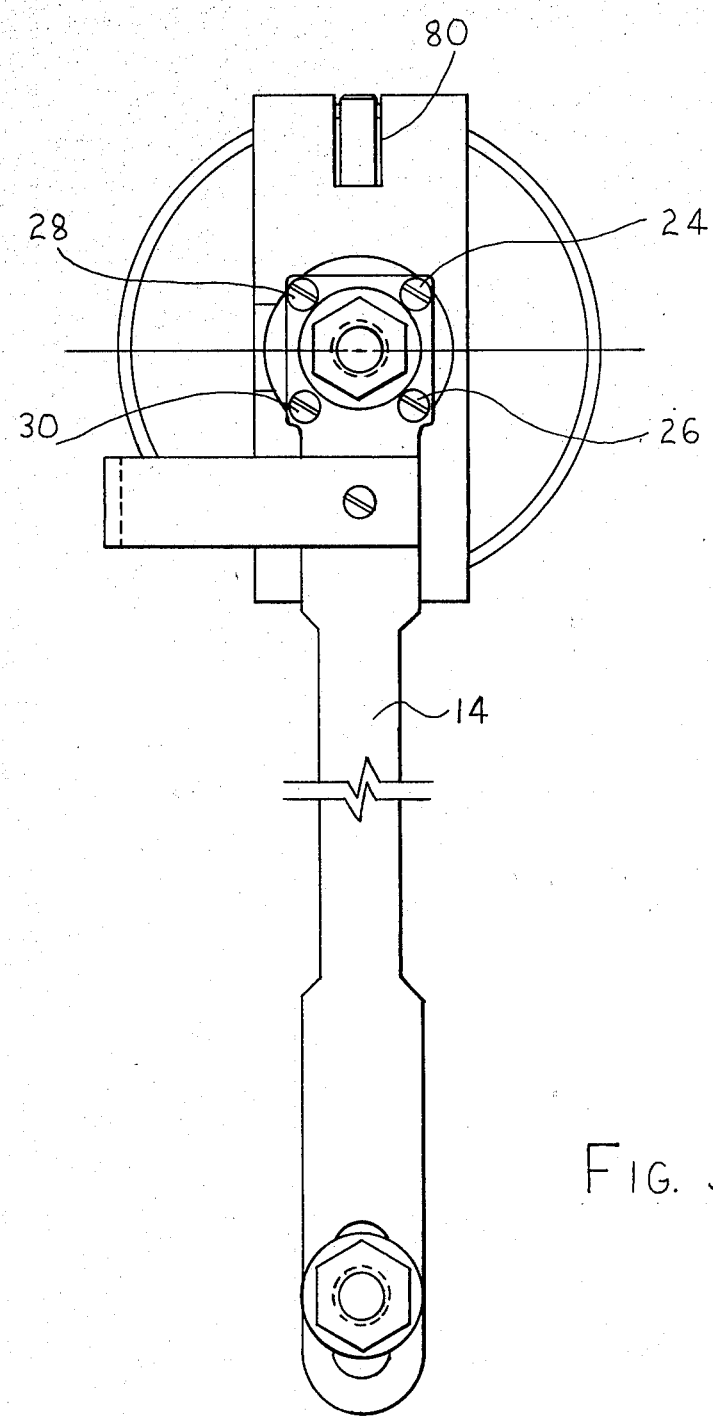
FIG. 3 is a side view in vertical elevation of the embodiment illustrated in FIG. 2.

Referring now to FIGS. 2 and 3 the braces 12 and 14 are attached by screws 24, 26, 28 and 30 to bearing 32 and by similar screws to bearing 34. A cross brace 35 connects the braces 12 and 14 so that together the braces and the bearings provide a support frame mounted to the vehicle. A rotatable shaft 36 is journalled in these bearings and is threaded at its opposite ends. A drive wheel 38 is fixed to the rotatable shaft 36 intermediate the bearings 32 and 34 by means of a key 40 for rotation therewith. The drive wheel 38 has an annular exterior, peripherial surface which has a curvature formed to approximately conform with the exterior of the vehicle tire 42 which it frictionally engages for driving the shaft 36 in rotation in proportion to the speed of the vehicle.

At one threaded end 43 is a thrust bearing 44 and a nut 46 for bolting the shaft 36 in position and retaining it against withdrawal from the bearing 32.

A similar thrust bearing 48 is on the shaft 36 outwardly of the other bearing 34. Outwardly of the thrust bearing 48 is an arm member 50 formed with a central bore 52 through which extends the rotatable shaft 36 and which is keyed to the shaft 36 by means of a key 54. The arm member 50 is formed with opposite, radially directed arms 56 and 58.

A weight member 60 is mounted to the radial arm 56 and a similar weight member 62 is mounted to the radial arm 58. These identical weight members are slideably mounted to the arms so that they may slide radially outwardly a distance which is proportional to the angular velocity of the rotatable shaft 36 and therefore proportional to the speed of the bicycle.

Each weight member, such as weight member 60, has a bearing member 64 having a central hole 66 which is slideable along the outwardly extending radial arm 56. A pair of rotatable rollers 70 and 72 are mounted to the bearing member 64.

The rollers from all of the weight members engage a thrust member 74. The thrust member 74 has a pair of legs 75 and 77 each associated with an outwardly extending radial arm of the arm member 50. The thrust member 74 is brazed or otherwise fixed to a collar 76 which is keyed to the rotatable shaft 36 for rotation therewith. The legs 75 and 77 of the thrust member 74 extend outwardly in a tapered configuration so that their interior surface forms an acute angle with the rotating shaft 36 and engages the rollers of the weight members 60 and 62. The outer ends of the thrust member legs 75 and 77 are formed with slots 80 and 82 so that the radial arms 56 and 58 can be extended beyond the legs of the thrust member in the position illustrated in FIG. 2 which is the position when the rotatable shaft is not rotating.

Compression springs 84 and 86 are held on the rotatable shaft 36 by means of a washer 88 and a nut 90 threadedly engaged to the threaded end 92 of the rotatable shaft 36. The springs 84 and 86 apply a force against the collar 76 of the thrust member 74 to urge the thrust member toward the weight member.

Surrounding the thrust member collar 76 are a pair of thrust bearings 94 and 96 separated by a cable pulling plate 98, all of which are held on the bushing 74 by the washer 100.

The cable pull plate 98 does not rotate with the thrust member 74, but translates axially with it. It is connected to the shift cable 22 which forms a linkage means which links the shift member of the derailleur to the thrust member in order to move the shift member in proportion to the axial translation of the thrust member for shifting the ratio of the transmission.

In operation, as the bicycle is propelled along a roadway the spinning shaft member 36 causes the weight members 60 and 62 to move outwardly against the force of the springs 84 and 86 a distance which is a function of the speed of the vehicle. The outward motion of the weight member 60 and 62 applies a force through the rollers of the weight members against the legs 75 and 77 of the thrust member 74 causing the entire thrust member to translate toward the springs 84 and 86, moving the cable an equal distance.

The spring forces and weights are determined by the characteristics of the particular bicycle as well as the comfort range of the rider. The spring forces may be chosen by the designer or rider and they may be made adjustable by a conventional spring force adjustment mechanism or simply by adjusting the axial position of the nut 90.

The springs 84 and 86 are used to counterbalance the force applied to them by the thrust member. Since the force applied by the thrust member is a square function of vehicle speed, an ideal spring for this device would apply a force which is a square function of its compression. In practice this can be approximated by the use of the two springs 84 and 86. As an alternative a single spring can be used with a spring constant of about 74 pounds per inch if the cable spring 23 at the derailleur is 7.6 pounds per inch. Thus, it can be seen that one advantage of the invention is that it gives a shifter displacement which is a linear function of speed. This aids in maintaining the pedal speed constant for all bike speeds.

Figure 4:
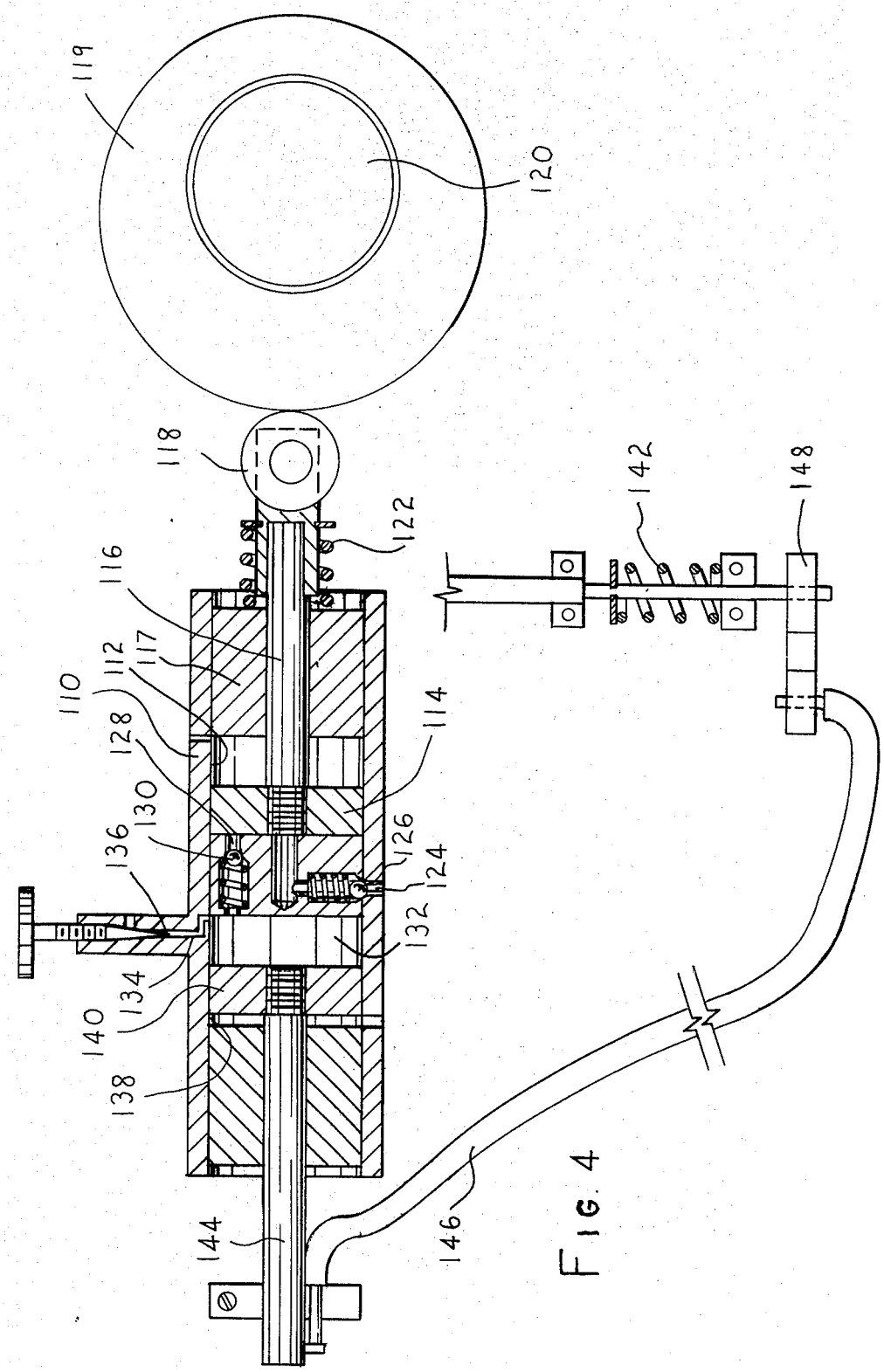
FIG. 4 is a diagrammatic view in vertical section illustrating an alternative fluid pumping embodiment of the invention.

FIG. 4 is a diagrammatic illustration of a preferred embodiment of the invention. It has a tubular housing 110 which may be mounted by suitable brackets or braces to the frame of the bicycle. One advantage of this embodiment is that it may be mounted radially inwardly from the tire rather than protruding outwardly from it. Therefore, it is easily mountable on a bicycle of the type having fenders without requiring any modification of the fenders.

A cylinder 112 is formed within the housing 110 and a mating piston 114 is mounted for reciprocation in the cylinder 112. The piston 114 is connected through a connecting rod 116, which extends through an end plug 117 to a cam follower 118. The cam follower 118 is controlled by a cam 119 which is attached to the rear wheel hub 120. A compression spring 122 biases the cam follower 118 into engagement against the cam 119 of the bicycle wheel.

An inlet port 124 is formed through the wall of the housing 110 and contains an inlet check valve 126. Similarly, an outlet port 128 communicates with the cylinder 112 and contains an outlet check valve 130.

The housing 110 together with the inlet and outlet ports and their respective check valves form a fluid pump which is drivingly connected to the vehicle wheel. It is driven in reciprocation as the wheel 120 rotates and pumps a fluid, such as air, into a chamber 132 formed in the housing 110 at a rate which is a function of the vehicle speed.

The chamber 132 is provided with a vent 134 having a needle valve 136 to allow adjustment of the orifice size of this exhaust vent. Thus, a fluid is pumped into the chamber 132 at a rate which is a function of vehicle speed, fluid is also simultaneously exhausted from the chamber 132 at a rate which is a function of both the chamber pressure and the size of the orifice.

A fluid pressure responsive means is formed in communication with the chamber 132. It comprises a cylinder 138 which conveniently may have a cylinder wall formed identically with the wall of the chamber 132 and which contains a mating piston 140 reciprocally mounted within the cylinder 138. The piston 140 is biased toward the chamber 132 by means of a compression spring 142. A piston rod 144 is fixed to the piston 140 and operates as an actuator which moves in linear translation against the spring 142 a distance which is proportional to the pressure in the chamber 132. The piston rod actuator 144 is connected through a linkage means such as the cable 146 to the shift member 148 of the derailleur or other variable speed transmission.

In operation the greater the ground speed of the vehicle the greater the rate at which fluid is pumped into the chamber 132. As fluid is pumped at a greater rate the pressure increases moving the piston 140 and its actuator piston rod 144 to move the shift lever 148 a distance which is a function of bicycle speed. At a constant speed, equilibrium will occur between the fluid pumping rate and the exhaust rate through the exhaust vent 134 to maintain a constant pressure in the chamber 132 and therefore a constant position of the piston rod actuator 144. The needle valve may be adjusted to cause the vehicle to automatically shift at the speeds which maximize comfort and convenience for the particular rider.

One major advantage of the embodiment of FIG. 4 is that the automatic shifter may be easily overriden by the rider's actuation of the manual shift cable.

In the preferred embodiment the cylinder 112 has an area of 1 square inch, the needle valve orifice is nominally 0.010 inch in diameter and the stroke of the piston 112 is desirably made ⅜ inch by forming the cam 119 with an eccentricity of 3/16 inch.

It should be understood that FIG. 4 is a diagrammatic view and that embodiments of the invention may be made of considerably less mass and less inertia. As another alternative other types of fluid pumps may be used such as bellows or diaphragm systems or lobe, vane or gear type pumps.

All of the embodiments may alternatively be driven from any portion of the drive train of the vehicle instead of directly from the wheels. Thus, the term "drivingly connected to a vehicle wheel" and the like is not limited to directly connected but includes equivalent connection to the drive train.

Figure 5:
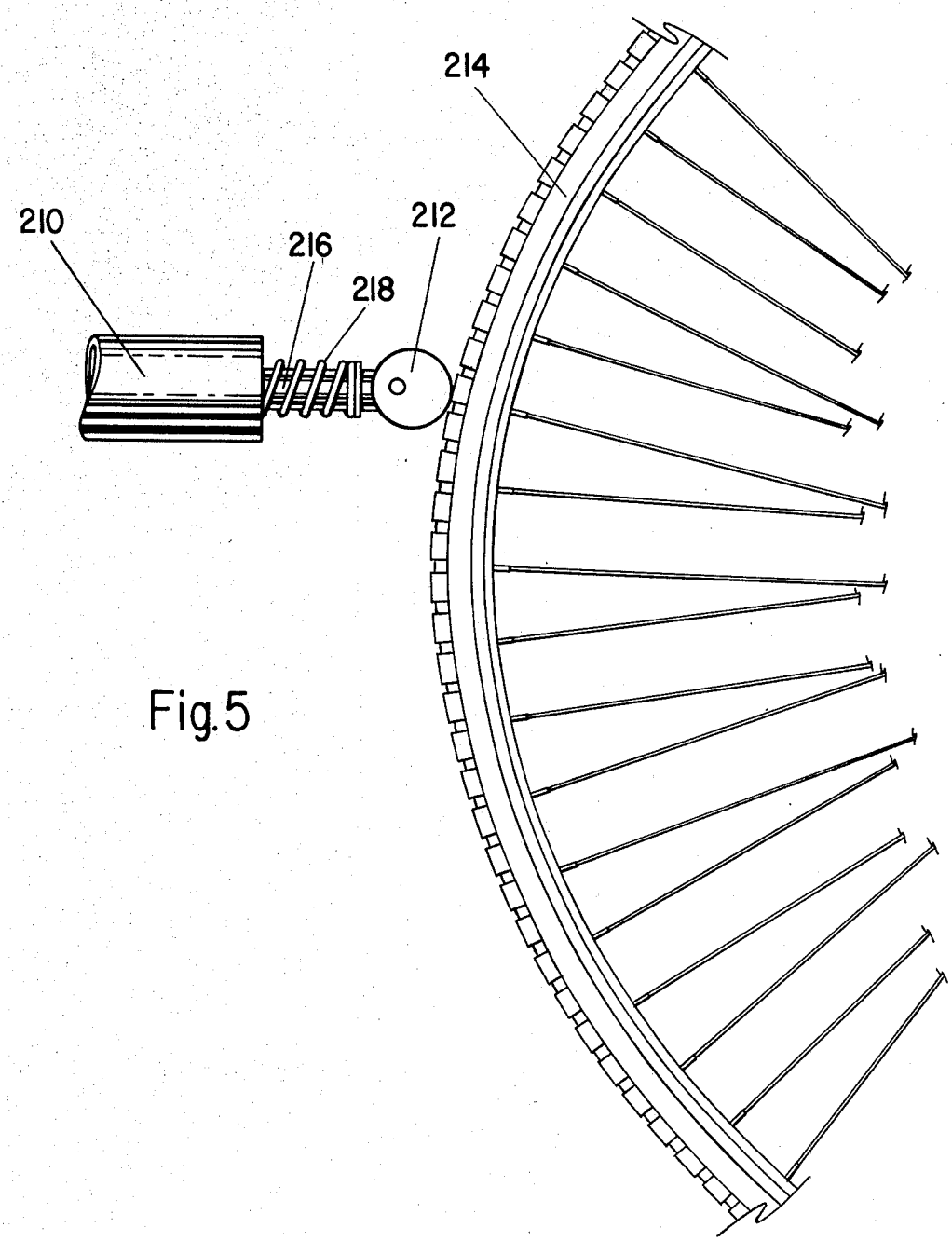
FIG. 5 is a view in side elevation of segments of an alternative embodiment of the invention.

FIG. 5 illustrates an alternative embodiment of the invention. It has a pump 210 containing a reciprocating piston like that illustrated in FIG. 4. A roller 212 is rotatable on a bearing member similar to the roller 118 of FIG. 4. However, the roller 212 is eccentrically rotatable and frictionally engages a wheel 214 of the vehicle. The piston rod 216 links the roller 212 to the piston. The roller 212 is biased against the wheel 214 by means of the spring 218 operating in the same manner as the spring 122 of FIG. 4.

It should be understood that a great variety of alternative, functionally equivalent structures are available in the prior art for modifying the preferred embodiments of the invention while remaining within the spirit of the invention which is defined by the following claims.

I claim:

1. An improved automatic transmission for a human powered vehicle which includes pedals drivingly connected through a variable speed transmission to a wheel, a movable shift member for changing the ratio of the transmission and a speed sensing means linked to said shift member for shifting the transmission ratio in response to vehicle speed wherein the improvement comprises a speed sensing means including:
    (a) a fluid pump drivingly connected to said vehicle for pumping fluid at a rate which is a function of vehicle speed said pump including a reciprocating piston-like member connected through a piston rod to an eccentric cam and cam follower mechanism linked to a wheel of said vehicle and biased into engagement;
    (b) a container having a chamber connected to said pump through the outlet check valve of said pump for receipt of pumped fluid, said chamber having a vent;
    (c) fluid pressure responsive means connected in communication with said chamber and having an actuator which moves in proportion to fluid pressure said pressure responsive means comprising a piston-like member reciprocally mounted in a mating cylinder, one end of said cylinder forming said chamber and means for biasing said piston like member toward said one end, said actuator being a piston rod connected to said piston-like member; and
    (d) linkage means linked to said shift member and said actuator for moving said shift member in proportion to the movement of said actuator for shifting the ratio of said transmission.

2. An automatic transmission in accordance with claim 1 wherein an adjustable valve is provided for controlling the fluid exhaust rate from said chamber.

3. An automatic transmission in accordance with claim 1 wherein said speed sensing means is mounted radially inwardly of a rim of a wheel of said vehicle and wherein said roller engages said rim.

* * * * *